United States Patent
Arakawa et al.

(10) Patent No.: US 7,405,728 B2
(45) Date of Patent: Jul. 29, 2008

(54) PORTABLE INFORMATION TERMINAL, PROGRAM, AND RECORDING MEDIUM HAVING THE PROGRAM RECORDED THEREIN

(75) Inventors: Emi Arakawa, Tokyo (JP); Kayo Sasaki, Tokyo (JP); Shigeya Yasui, Kanagawa (JP); Mayu Irimajiri, Tokyo (JP)

(73) Assignees: Sony Corporation (JP); Sony Ericsson Mobile Communications Japan, Inc. (JP)

( * ) Notice: Subject to any disclaimer, the term of this patent is extended or adjusted under 35 U.S.C. 154(b) by 263 days.

(21) Appl. No.: 10/487,351

(22) PCT Filed: Jun. 27, 2003

(86) PCT No.: PCT/JP03/08238

§ 371 (c)(1),
(2), (4) Date: Jan. 27, 2005

(87) PCT Pub. No.: WO2004/006549

PCT Pub. Date: Jan. 15, 2004

(65) Prior Publication Data
US 2005/0122806 A1 Jun. 9, 2005

(30) Foreign Application Priority Data
Jul. 2, 2002 (JP) ............................. 2002-192964

(51) Int. Cl.
*G06F 3/033* (2006.01)
*G06F 3/02* (2006.01)
*G09G 5/00* (2006.01)
*H01H 9/00* (2006.01)
*H01H 13/70* (2006.01)
*H01H 25/00* (2006.01)
*H01H 25/04* (2006.01)

(52) U.S. Cl. ............................ 345/184; 345/169; 200/4; 200/5 R
(58) Field of Classification Search ................. 345/156, 345/157, 159, 184, 169, 160; 200/4, 5 R, 200/6 A, 14, 17 R, 18
See application file for complete search history.

(56) References Cited

U.S. PATENT DOCUMENTS 6,225,980 B1 * 5/2001 Weiss et al. .................. 345/161

(Continued)

FOREIGN PATENT DOCUMENTS

EP 961461 A1 * 12/1999
JP 3-185496 A 8/1991

(Continued)

OTHER PUBLICATIONS

International Search Report Aug. 12, 2003.
European Search Report; Application No.: 03 736 299.3—1246; Dated: Aug. 10, 2007.

*Primary Examiner*—Bipin Shalwala
*Assistant Examiner*—Steven E Holton
(74) *Attorney, Agent, or Firm*—Rader Fishman & Grauer PLLC; Ronald P. Kananen

(57) ABSTRACT

High-speed scrolling is performed when an operating dial 35 is rotated taking a central button member 36 as an axis, and low-speed scrolling when pushing either an upper button 42A or a lower button 42C by pushing the operating dial 35 in the direction of an axis of rotation. It is therefore possible to include information it is wished to view, in an appropriate manner within a display range of a screen, with fewer operations by appropriately changing over the speed of scrolling. In addition, as it is possible to operate the operating dial 35 for both high-speed scrolling and low-speed scrolling, when changing over the speed of scrolling, it is possible to change over the speed of scrolling in a straightforward manner without operating members other than the member that has been operated so far.

20 Claims, 13 Drawing Sheets

U.S. PATENT DOCUMENTS

| | | | |
|---|---|---|---|
| 6,396,006 B1 * | 5/2002 | Yokoji et al. | 200/4 |
| 6,534,730 B2 * | 3/2003 | Ohmoto et al. | 200/4 |
| 6,546,231 B1 * | 4/2003 | Someya et al. | 455/550.1 |
| 2002/0011402 A1 * | 1/2002 | Ohmoto et al. | 200/4 |
| 2002/0080152 A1 * | 6/2002 | Sudo et al. | 345/672 |
| 2002/0196239 A1 * | 12/2002 | Leww | 345/184 |

FOREIGN PATENT DOCUMENTS

| | | |
|---|---|---|
| JP | 05-257457 | 10/1993 |
| JP | 11-272378 A | 10/1999 |
| JP | 2000-163192 | 6/2000 |
| JP | 2001-053854 | 2/2001 |
| JP | 2001-268201 | 9/2001 |

* cited by examiner

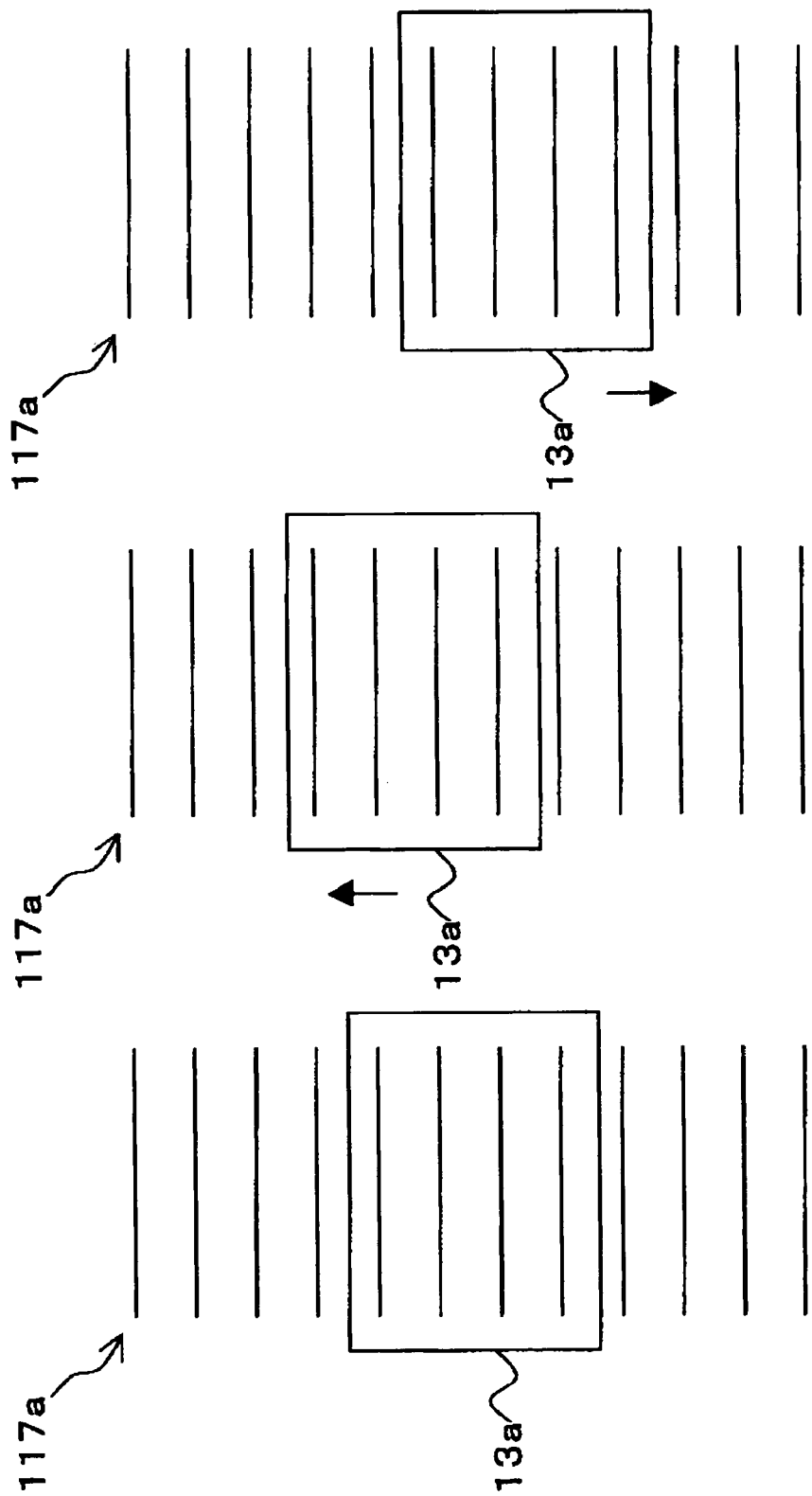

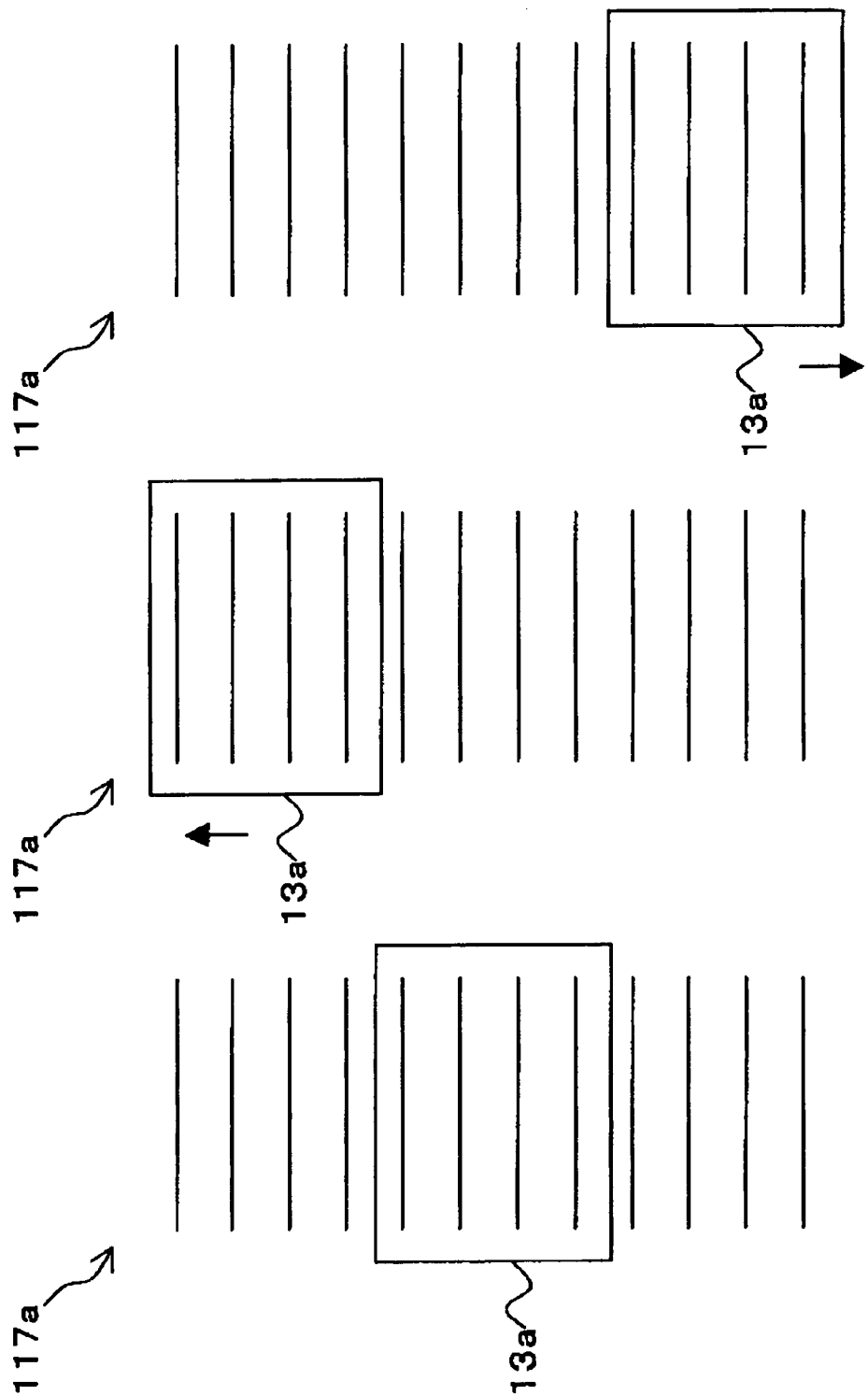

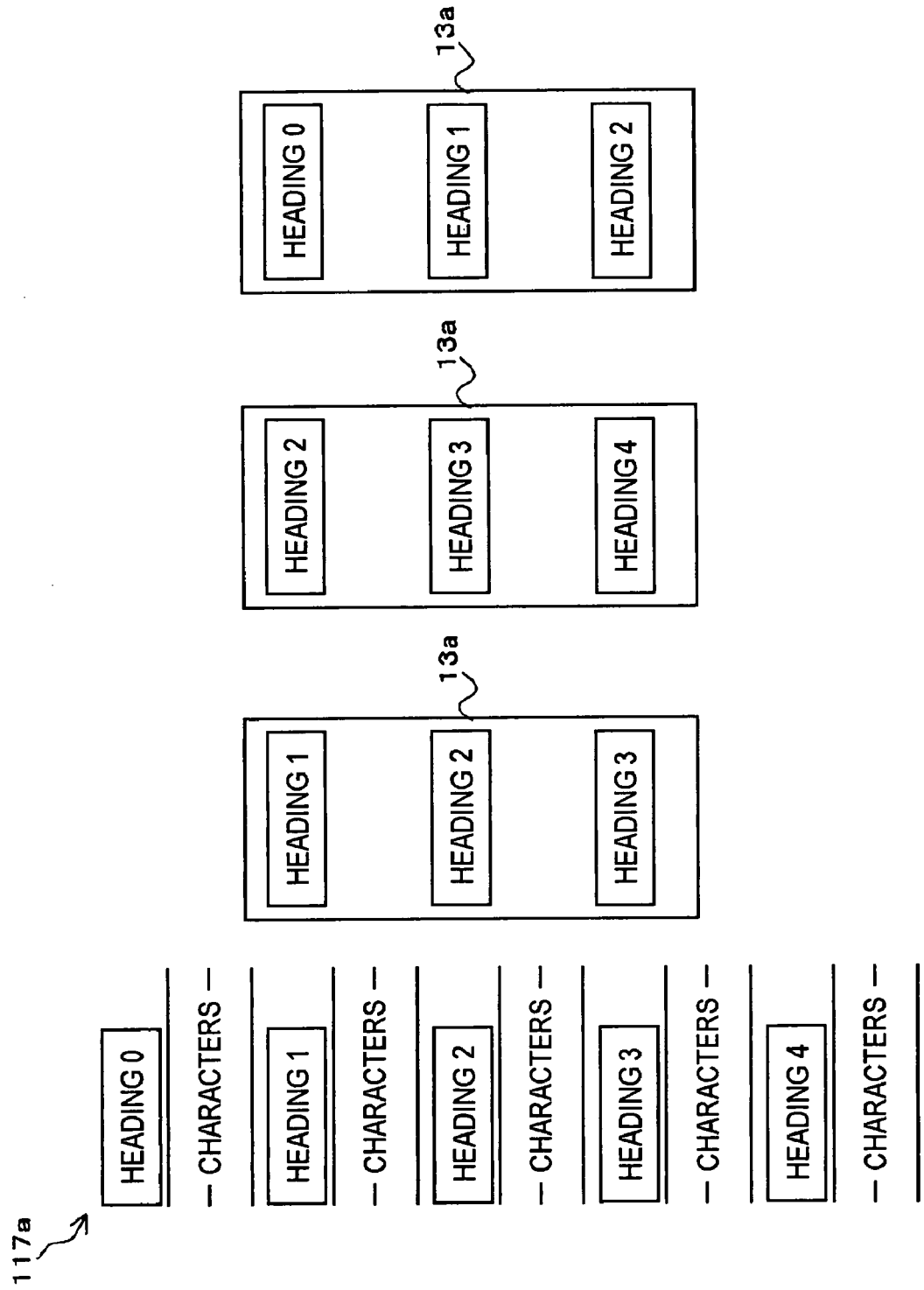

PORTABLE INFORMATION TERMINAL, PROGRAM, AND RECORDING MEDIUM HAVING THE PROGRAM RECORDED THEREIN

TECHNICAL FIELD

The present invention relates to the scrolling of a screen of a portable information terminal, such as a mobile telephone, etc.

BACKGROUND ART

With portable information communication terminals such as mobile telephones of the related art, information, etc. acquired via the Internet is displayed on a screen. When the amount of information that a user wants to display is substantial, there are situations in which it is only possible to display part of this information on a screen. It is then possible to display all of the information that the user wants to display by carrying out a so-called scrolling. "Scrolling" refers to, for example, moving an information display range up and down by one line by pressing a numeric key pad, etc. of a mobile telephone. By scrolling, it is possible for a user of a mobile telephone etc. to look through information that he wants to view in such a manner that the information is contained within the screen display range.

However, as the information display range is moved up or down one line at a time, it is necessary to perform repeatedly the same operation (for example, continually pressing the same key a number of times) in order to ensure that the information the user wants to view is contained in the display range. This is more prominent when the volume of information is large.

If the information display range is made to go up or down by one page at a time, the scrolling speed increases, and the number of operations required to ensure that the information the user wants to view is contained within the display range is reduced. However, if the portions of information displayed are moved one page at a time, then there are cases where the portions of displayed information change too drastically. As a result, there are cases where the information that the user wants to view does not appear at a position within the display range that is easy to view.

Therefore, the present invention solves the problem of including properly, with a reduced number of operations, information that the user wants to view within a display range of a screen such as that of a portable telephone and the like.

DISCLOSURE OF THE INVENTION

A portable information terminal of the present invention is characterized by: display means for displaying information; scrolling operation means for enabling an operator to carry out a first operation and a second operation differing from the first operation, first scrolling control means for controlling the display means to scroll through information displayed at the display means at a first speed when the first operation is carried out by the scrolling operation means; and first scrolling control means for controlling the display means to scroll through information displayed at the display means at a second speed slower than the first speed when the second operation is carried out by the scrolling operation means.

According to this configuration, it is possible to perform scrolling of information displayed by the display means selectively at different speeds in a straightforward manner using common scrolling operation means.

BRIEF DESCRIPTION OF DRAWINGS

FIG. 9A to FIG. 9C are views showing ways of changing the display range using a second scrolling control unit 111b, and they show an original display range 13a (FIG. 9A), a display range 13a for when an upper button 42A is pressed (FIG. 9B), and a display range 13a for when a lower button 42C is pressed (FIG. 9C).

FIG. 10A to FIG. 10C are views showing ways of changing the display range using a first scrolling control unit 111a, and they show an original display range 13a (FIG. 10A), a display range 13a when an operating dial 35 is rotated in an counterclockwise direction (FIG. 10B), and a display range 13a when the operating dial 35 is rotated in a clockwise direction (FIG. 10C).

FIG. 11A to FIG. 11D are views showing ways of changing the display range using the first scrolling control unit 111a, and they show an original display range 13a (FIG. 11A), a display range 13a only displaying headings (FIG. 11B), a display range 13a when the operating dial 35 is rotated in a clockwise direction (FIG. 11C), and a display range 13a when the operating dial 35 is rotated in an counterclockwise direction (FIG. 11D).

BEST MODES FOR CARRYING OUT THE INVENTION

The following is a description with reference to the drawings of preferred embodiments of the present invention.

Figure 1:
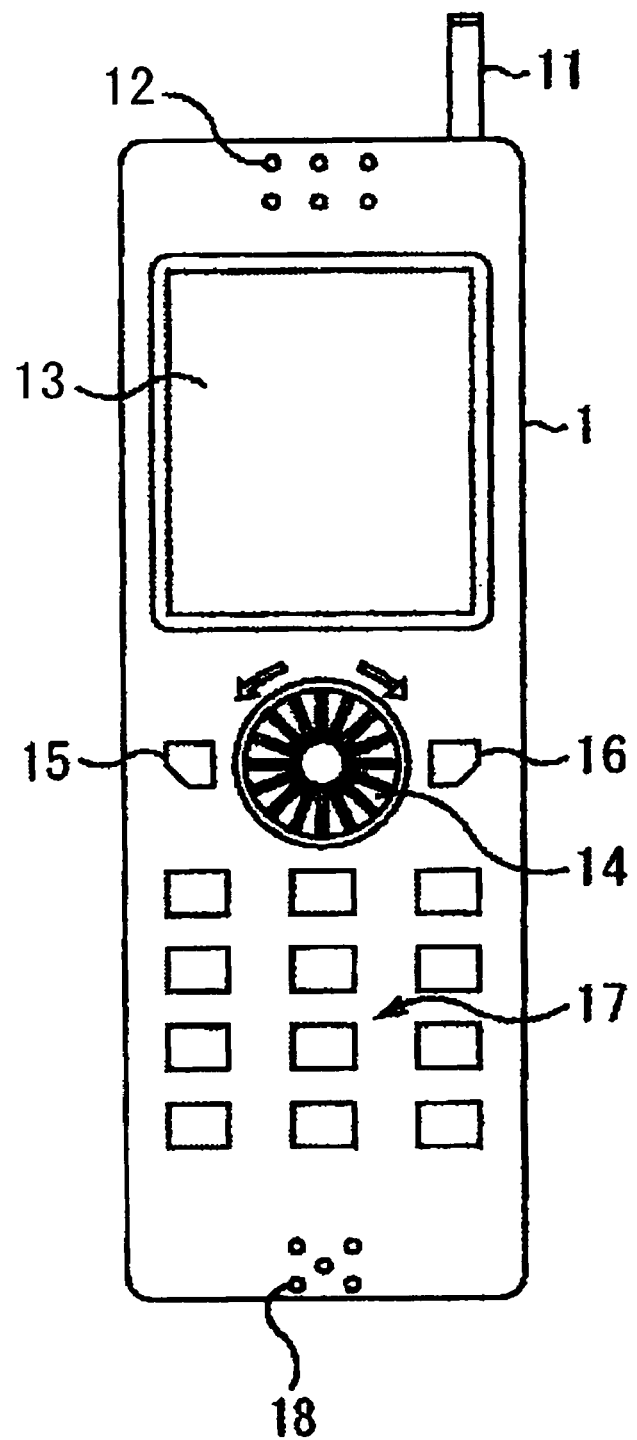
FIG. 1 is a view showing the external appearance of an example configuration for a mobile telephone 1 to which the present invention is applied.

FIG. 1 is a view showing the external appearance of an example configuration for a mobile phone device 1 to which the present invention is applied.

A substantially disc-shaped rotating input unit 14 is provided at substantially the center of a mobile phone device 1. The rotating input unit 14 is configured so as to be capable of rotating freely in a clockwise direction and a counterclockwise direction centered about an axis of rotation that is vertical with respect to the page and substantially at the center of the page, as shown by hollow arrows. A user is able to input various instructions by operating the rotating input unit 14, a talk button 15 and power button 16 provided to the left and right respectively of the rotating input unit 14, and a numeric key pad 17 provided below.

With the mobile phone device 1 shown in FIG. 1, a user can, for example, scroll Japanese news, etc. displayed as a result of downloading from the internet by rotating the rotating input unit 14 or pressing a prescribed position of the upper surface (plane) of the rotating input unit 14 in a direction towards the inside of the mobile phone device 1 while viewing a display unit 13 included of an LCD (Liquid Crystal Display), etc.

A speaker 12 and a microphone 18 are provided respectively in the vicinity of an upper end and a lower end of the front surface of the mobile phone device 1, and these are utilized when a user talks. An antenna 11 is provided at an upper end surface of the mobile phone device 1 so as to project from the box.

The mobile phone device 1 does not have to be the so-called straight type shown in FIG. 1, and it also may be of a configuration where a first case where the display unit 13 is provided and a second case where the rotating input unit 14 and the numeric key pad 17 are provided fold via a hinge.

FIG. 2 to FIG. 5 show example structures for the rotating input unit 14.

Figure 2:
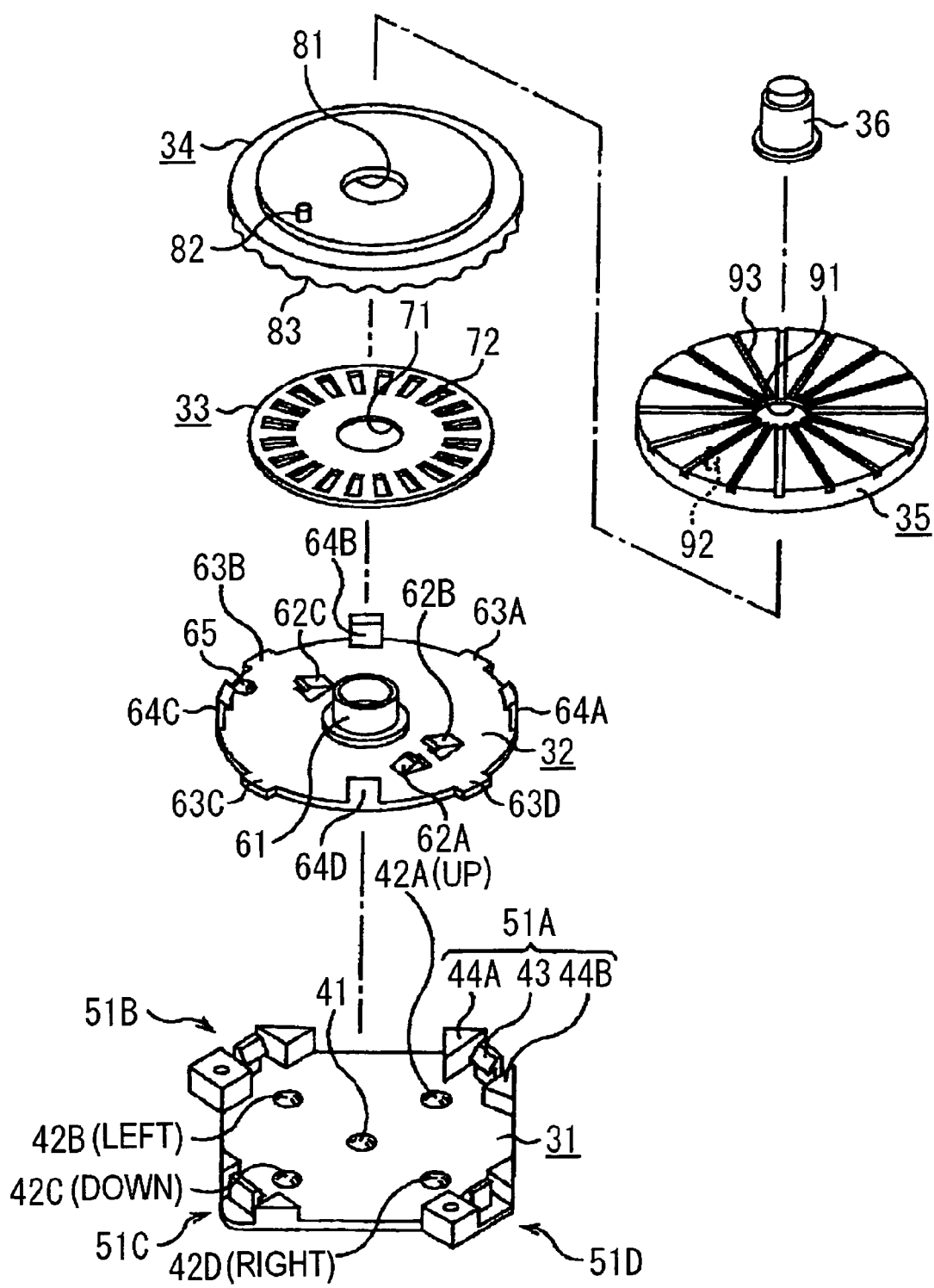
FIG. 2 is an exploded perspective view of a rotating input unit 14.

As shown in FIG. 2, the rotating input unit 14 fundamentally includes a base 31, a holder 32, a scale 33, a dial body 34, an operating dial 35, and a central button member 36.

The base 31 is formed, for example, from an insulating resin, and it is in the shape of a substantially rectangular plate. A central button 41 is provided at the center of the upper surface of the base 31, with surrounding buttons 42A to 42D being arranged at equal intervals about the periphery. The base 31 is such that a line connecting surrounding button 42A and surrounding button 42C is substantially parallel with a central line in a direction from the top to the bottom of the mobile phone device 1 of FIG. 1. Surrounding button 42A is positioned at an upper side of the mobile phone device 1 shown in FIG. 1 and surrounding button 42B is positioned on the left side. Further, surrounding button 42C is positioned on a lower side of the mobile phone device 1 shown in FIG. 1, and surrounding button 42D is positioned on the right side (in the following, as appropriate, surrounding button 42A, surrounding button 42B, surrounding button 42C, and surrounding button 42D are referred to as upper button 42A, left button 42B, lower button 42C, and right button 42D, respectively). A claw extending towards the center of the base 31 is provided at an upward movement restricting member 43 so that upward movement of the holder 32 is restricted by this claw. Rotational movement restricting members 44A and 44B are provided with slight spacing on either side of the upward movement restricting member 43, so that rotation of the holder 32 is restricted by the rotational movement restricting members 44A and 44B. A holder restricting part 51A is formed from the upward movement restricting member 43 and the rotational movement restricting members 44A and 44B, with similar parts (holder restricting parts 51B, 51C, 51D) being arranged at the remaining three corners of the four corners of the base 31.

The holder 32 is taken to be in the shape of an insulating disc having a hole in the middle, and it is formed with a dial support cylinder 61 for supporting the dial body 34, etc. in a freely rotating manner projecting from the periphery of the hole to the upper surface side (upper side in FIG. 2) from the center of the upper surface. An axis at the center of the hole of the dial support cylinder 61 is therefore the axis of rotation of the dial body 34, etc.

Further, brushes 62A, 62B and 62C that are resilient members that are electrically conductive are arranged at the upper surface of the holder 32. The amount of rotation of the rotating input unit 14 (operating dial 35) and the direction of rotation then can be detected by detecting changes in the state of electrical connection of the brushes 62A, 62B and 62C and a scale 33 provided on the holder 32.

Specifically, the positioning of the brushes 62A and 62B in the radial direction is such as to give the position of contact with the slits 72 of the scale 33 when the scale 33 is arranged above the holder 32. When the rotating input unit 14 is then rotated so as to cause accordingly rotation of the scale 33, there is repeated contact (positions between a slit 72 and a slit 72) and non-contact (positions of the slits 72) between the brushes 62A and 62B and the scale 33.

On the other hand, when the scale 33 is arranged above the holder 32, the brush (earth brush) 62C is arranged so as to be positioned so as to make contact usually with the scale 33, so that when the scale 33 is rotated, there is repeated conduction and non-conduction with brushes 62A and 62B via the scale 33.

As a result, the amount of rotation of the rotating input unit 14 can be calculated based on the number of pulses generated corresponding to the changes (repeated contact and non-contact of the brushes 62A and 62B and the scale 33) of the conductive state between the brushes 62A and 62B and the brush 62C.

Further, it is possible to detect the direction of rotation of the rotating input unit 14 by arranging brush 62A and brush 62B to be slightly offset in the circumferential direction. In other words, in the case of rotation of the rotating input unit 14 in an counterclockwise direction in the state in FIG. 1, rises (or falls) of pulses generated as a result of contact between the brush 62A and the scale 33 can be detected at a faster timing by just the offset portion than rises (or falls) in pulses generated as a result of contact between the brush 62B and the scale 33.

Conversely, in the case of rotation of the rotating input unit 14 in a clockwise direction, rises (or falls) in pulses generated as a result of contact between the brush 62B and the scale 33 can be detected at a faster timing than rises (or falls) of pulses generated as a result of contact between the brush 62A and the scale 33.

The direction of rotation of the rotating input unit 14 can be detected therefore based on shifts in the timing of rises (or falls) of pulses appearing in this manner.

Restricted members 63A to 63D corresponding to the holder restricting parts 51A to 51D are formed at the peripheral edge of the holder 32 so that when the holder 32 is arranged on the base 31, movement (rotation and detachment) of the restricted members 63A to 63D is restricted by the holder restricting parts 51A to 51D.

Figure 3:
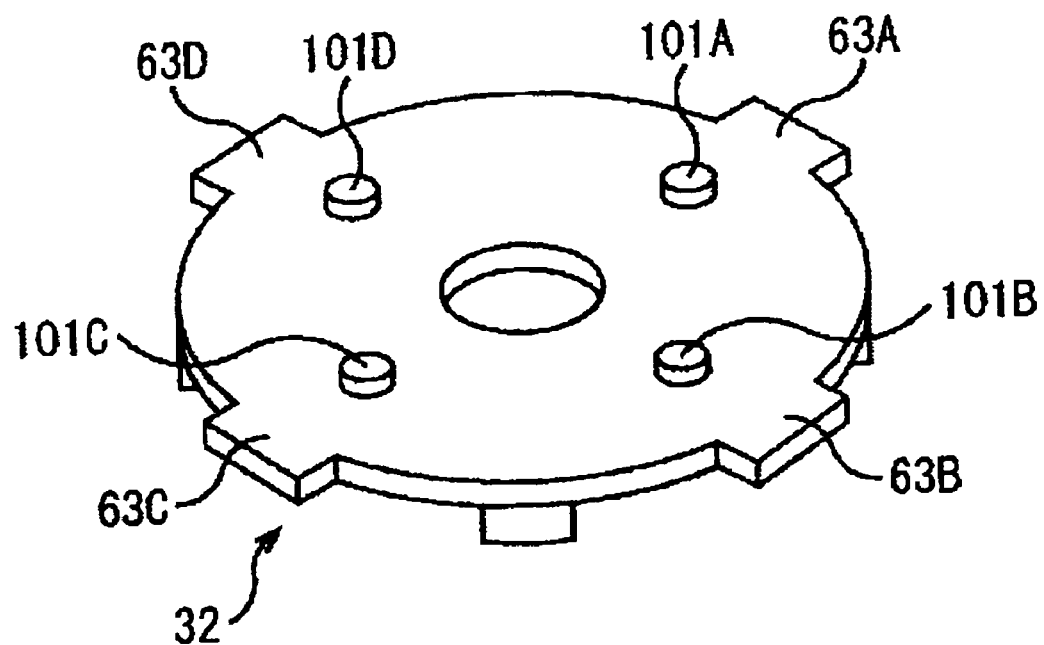
FIG. 3 is a perspective view showing a reverse side of a holder 32.

Button press-down projections 101A to 101D are provided as shown in FIG. 3 at positions on the rear surface of the holder 32 corresponding to the surrounding buttons 42A to 42D. Therefore, with the mobile phone device 1 shown in FIG. 1, when the upper side of the rotating input unit 14 is pushed down in a direction perpendicular with respect to the paper, the upper button 42A (surrounding button 42A) is pushed down by button press-down projection 101A, and when the left side of the rotating input unit 14 is pushed down, left button 42B (surrounding button 42B) is pushed down by the button press-down projection 101B. Similarly, when the lower side of the rotating input unit 14 is pushed down, the lower button 42C (surrounding button 42C) is pushed down by button press-down projection 101C, and when the right side of the rotating input unit 14 is pushed down, right button 42D (surrounding button 42D) is pushed down by the button press-down projection 101D.

Dial body support members 64A to 64D are formed spaced at prescribed distances at a peripheral edge part of the holder 32 so as to project from the upper surface side (upper side in the drawing). Claws extending towards the central side of the holder 32 are formed at upper ends of the dial body support members 64A to 64D so as to restrict the detachment of the dial body 34 using these claws.

Further, a click-sensation projection 65 is provided at the upper surface of the holder 32, so that when the rotating input unit 14 is rotated, a click sensation is generated for the user by the click sensation projection 65 and a click-sensation uneven part 83 of the dial body 34.

Figure 4:
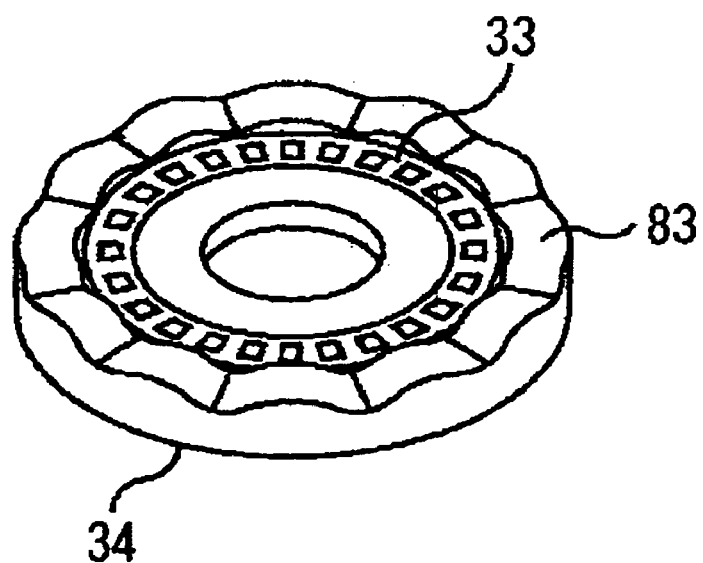
FIG. 4 is a perspective view showing a state where a scale 33 is fixed to a dial body 34.

A hole 71 into which the dial support cylinder 61 is inserted is formed at a central part of the scale 33. As described above, a multiplicity of slits 72 are formed radially with a prescribed angle pitch in the vicinity of the peripheral edge of the scale 33 at the periphery thereof. As shown in FIG. 4, the scale 33 is fixed to the rear surface of the dial body 34 on the holder 32.

A hole 81 into which the dial support cylinder 61 is inserted is formed at the center of the dial body 34, and a transmission projection 82 is formed on the upper surface of the dial body 34. The transmission projection 82 fits into a transmission recess 92 formed at the rear surface of the operating dial 35, so that rotational force of the operating dial 35 is transmitted to the dial body 34.

Further, at the peripheral edge part of the rear surface of the dial body 34, the click-sensation uneven part 83 that is wave-shaped as shown in FIG. 4 is formed over the entire periphery and, as described above, the click sensation projection 65 fits with play into this recess.

A hole 91 into which the central button member 36 is inserted with play is formed at the center of the operating dial 35. Further, the transmission recess 92 into which the transmission projection 82 of the dial body 34 fits is formed at the rear surface of the operating dial 35. The central button member 36 is shown in FIG. 2 as a cylindrical shape, but also may be spherical. A multiplicity of channels 93 extending radially are formed on the upper surface of the operating dial 35 in order to generate an appropriate amount of friction during a rotation operation to improve operability. The channels 93 also may not be present.

From each member described above, the rotating input unit 14 shown in FIG. 5 is formed from each of the members described above, and it is incorporated in a mobile phone device 1 with the upper surface of the operating dial 35 exposed.

Figure 5:
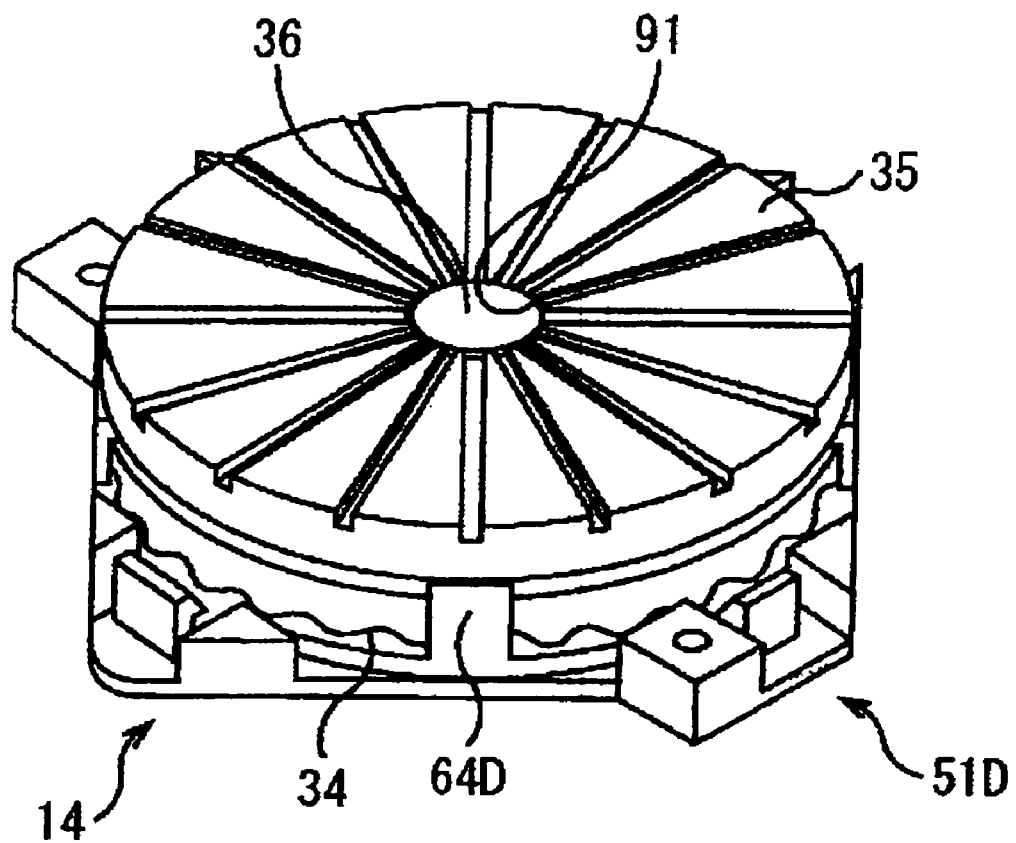
FIG. 5 is an exploded view of a rotating input unit 14.

At the rotating input unit 14 shown in FIG. 5, a user can press the upper button 42A by pressing down the upper right (upper side in FIG. 1) of the operating dial 35. Further, the lower button 42C can be pressed by pressing down the lower left (lower side in FIG. 1) of the operating dial 35.

Figure 6:
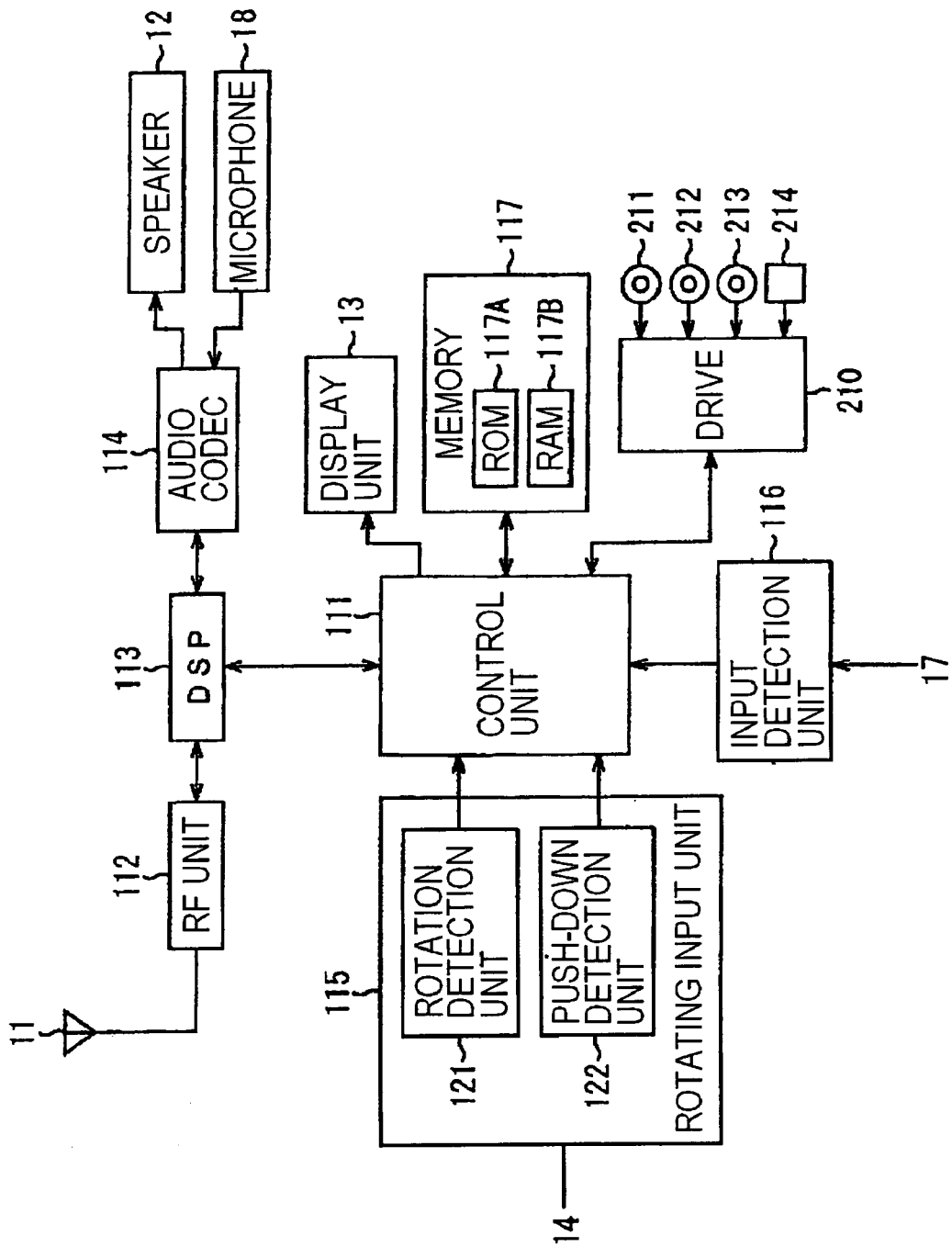
FIG. 6 is a hardware block diagram showing the inside of an example configuration for a mobile telephone 1 to which the present invention is applied.

FIG. 6 is a hardware block diagram showing the inside of an example configuration for a mobile phone device 1 to which the present invention is applied.

A control unit 111 expands a control program stored in ROM (Read Only Memory) 117A of memory 117 into RAM (Random Access Memory) 117B, and it controls operation of the whole of the mobile phone device 1 in accordance with the expanded control program.

For example, the control unit 111 exerts control so as to start up a scrolling processing program based on an instruction from a user, and it controls a display unit 13 so as to change portions of display target information that is displayed at the display unit 13, i.e., so as to scroll through displayed information. When an input to the rotating input unit 14 is detected by a rotation detection unit 121 of an input detection unit 115 (when the rotating input unit 14 is rotated), the control unit 111 controls a DSP (Digital Signal Processor), calculates rotation amount and rotation direction, etc. of the rotating input unit 14, and scrolls through information displayed at the display unit 13. Processing of the control unit 111 for changing displayed range of the display unit 13 according to input to the rotating input unit 14 is described in the following.

A RF (Radio Frequency) unit 112 transmits and/or receives electromagnetic waves to and from a base station via an antenna 11. For example, during an audio talk mode, RF signals received by the antenna 11 are amplified and subjected to frequency conversion processing and analog/digital conversion processing, etc., and the obtained audio data is outputted to a DSP 113. Further, when audio data is provided by the DSP 113, the RF unit 112 subjects this data to prescribed processing such as digital/analog conversion processing and frequency conversion processing, etc., and an obtained audio signal is transmitted from the antenna 11.

The DSP 113 then subjects the audio data provided by the RF unit 112 to, for example, spectrum inverse diffusion processing, and the obtained data is outputted to an audio codec 114. Further, the DSP 113 subjects the audio data supplied from the audio codec 114 to spectrum diffusion processing and outputs the obtained data to the RF unit 112. Moreover, the DSP 113 carries out processing to calculate the amount of rotation and direction of rotation, etc., in order to change over the display of an image based on control by the control unit 111.

The audio codec 114 converts audio for the user collected by the microphone 18 to audio data and outputs this to the DSP 113. Further, the audio codec 114 converts audio data provided by the DSP 113 to an analog audio signal and outputs a corresponding audio signal from the speaker 12.

The brushes 62A, 62B and 62C of FIG. 2 are connected to the rotation detection unit 121 of the input detection unit 115. The rotation detection unit 121 monitors the state of contact and non-contact of the brushes 62A and 62B and the scale 33 and outputs pulses corresponding to changes in the contact state to the control unit 111.

The central button 41 and the surrounding switches 42A to 42D of FIG. 2 are connected to a push-down detection unit 122 of the input detection unit 115. When these buttons are pushed down (when the upper surface of the rotating input unit 14 is pushed down in the direction of the inside), the push-down detection unit 122 detects this, and a corresponding signal is outputted to the control unit 111.

A drive 210 is connected to the control unit 111 as necessary. A magnetic disc 211, an optical disc 212, a magneto-optical disc 213, or a semiconductor memory 214, etc. is then installed as appropriate. Computer programs (for example, programs for implementing the first scrolling control unit 111a and the second scroll control unit 111b) are then installed in the control unit 111 as necessary.

An input detection unit 116 then detects input from other buttons, such as the talk button 15, the power button 16, and the numeric key pad 17 provided on the mobile phone device 1 and outputs corresponding signals to the control unit 111.

First Embodiment

Figure 7:
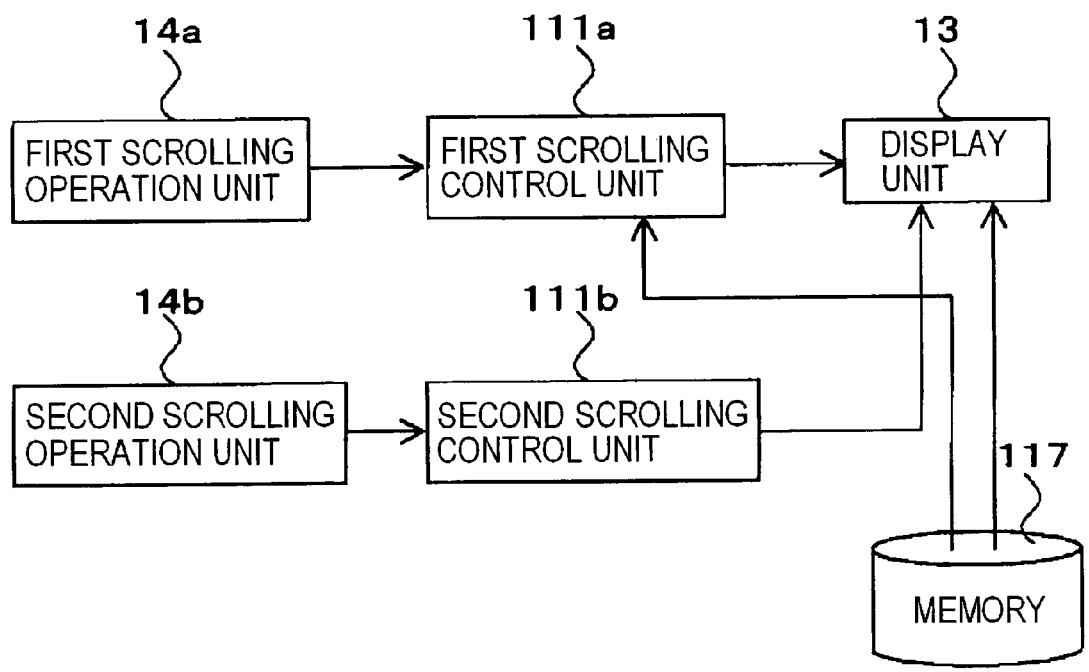
FIG. 7 is a functional block view of a mobile telephone (portable information communication terminal) 1 of a first embodiment of the present invention.

FIG. 7 is a functional block view of a mobile phone device (portable information communication terminal) 1 of a first embodiment of the present invention. The mobile phone device (mobile information communication terminal) 1 is equipped with the first scrolling operation unit 14a, a second scrolling operation unit 14b, a first scrolling control unit 111a, a second scrolling control unit 111b, a display unit 13, a and memory 117.

The scroll operation unit 14a has the scale 33, the dial body 34, the operating dial 35, and the brushes 62A, 62B and 62C.

Figure 8A:
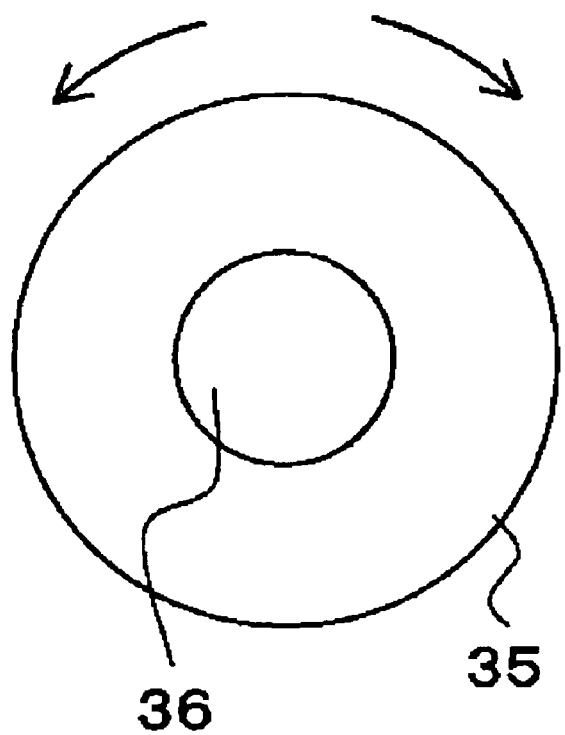
FIG. 8A and FIG. 8B are views showing the operation (FIG. 8A) of a first scrolling operation unit 14a and the operation (FIG. 8B) of a second scrolling operation unit 14b.

A description is now given of the operation with respect to the first scrolling operation unit 14a with reference to FIG. 8A. The operating dial 35 of the first scrolling operation unit 14a is made to rotate taking the central button member 36 as an axis of rotation, i.e., it is made to rotate in the direction of the arrows shown in FIG. 8A. As described previously, the amount of rotation and the direction of rotation are detected based on contact between the scale 33 and the brushes 62A, 62B and 62C. The first scrolling control unit 111a operates based on the amount of rotation and the direction of rotation and controls the display unit 13 so as to scroll through the displayed information.

The second scrolling control unit 14b includes the holder 32, a dial body 34, an operating dial 35, an upper button 42A and a lower button 42C.

Figure 8B:
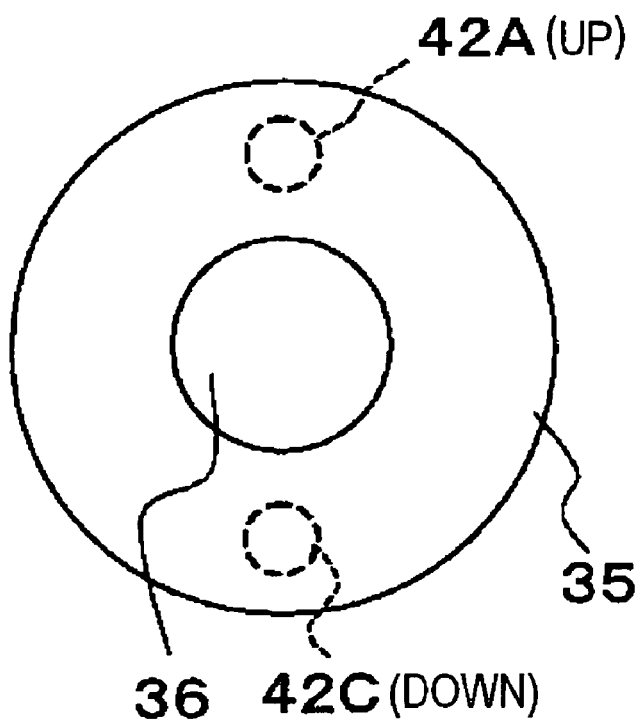

A description is now given of the operation with respect to the second scrolling operation unit 14b with reference to FIG. 8B. In FIG. 8B, when the operating dial 35 of the second scrolling control unit 14b is pushed down from the top, i.e., when the operating dial 35 is pushed down in the direction of the axis of rotation of the operating dial 35, the upper button 42A is pushed. Further, when the operating dial 35 of the second scrolling control unit 14b is pushed down from the bottom, i.e., when the operating dial 35 is pushed down in the direction of the axis of rotation of the operating dial 35, the lower button 42C is pushed. By pushing either of the upper button 42A or the lower button 42C, the second scroll control unit 111b operates and controls the display unit 13 in such a manner as to scroll through the displayed information.

Here, the first scrolling operation unit 14a and the second scrolling control unit 14b share the operating dial 35. The operating dial 35 is common to the first and second scrolling operation units 14a and 14b, and the operating dial 35 is said to be a common member. As described above, if the operating dial (common member) 35 is rotated, the first scrolling operation unit 14a operates and the first scrolling control unit 111a is operated. If the operating dial (common member) 35 is pressed down, the second scrolling operation unit 14b operates and the second scrolling control unit 111b is operated. The operating dial 35 is thin in the direction of the axis of rotation and is a disc-shaped member with a hole 91 opened at a central portion. Here, the concept of "disc-shaped" includes items with holes and items without holes.

The scrolling speed due to the second scrolling control unit 111b is taken to be slower than the speed of change of the first scrolling control unit 111a. The scrolling operation of the second scroll control unit 111b is now described with reference to FIG. 9A to FIG. 9C.

As shown in FIG. 9A, information 117a spanning a plurality of lines exceeds a display range 13a of the display unit 13. As a result, part of the information 117a is displayed at the display range 13a. Here, when the upper button 42A is pressed, as shown in FIG. 9B, the display range 13a moves up by one line. Further, when the lower button 42C is pressed, as shown in FIG. 9C, the display range 13a moves down by one line. In this way, because movement (scrolling) of the display range 13a is one line at a time, this is slower than the scrolling of the first scrolling control unit 111a that is described later.

The scrolling operation of the first scroll control unit 111a is now described with reference to FIG. 10A to FIG. 10C and FIG. 11A to FIG. 11D.

As shown in FIG. 10A, part of the information 117a is displayed at the display range 13a. Here, when the operating dial 35 is made to rotate by a prescribed amount (for example, thirty degrees) in an counterclockwise direction, as shown in FIG. 10B, the display range 13a moves up four lines. Further, when the operating dial 35 is made to rotate by a prescribed amount (for example, thirty degrees) in a clockwise direction, as shown in FIG. 10C, the display range 13a moves down four lines. In this way, the scrolling speed due to the scrolling control unit 111b is four times the scrolling speed due to the second scrolling control unit 111b because the display range 13a moves (scrolls) four lines at a time.

Further, there also are cases where headings are assigned to the information 117a, and scrolling utilizing the headings also can be considered. A scrolling operation of the first scroll control unit 117a utilizing headings is now described with reference to FIG. 11A to FIG. 11D. The presence or absence of headings can be determined by the first scrolling control unit 111a.

The information 117a may be, for example, today's news downloaded via the Internet. It is typical for headings indicating topics to be assigned to news as shown in FIG. 11A. For example, it is taken that heading 0, heading 1, heading 2, heading 3, heading 4, . . . are assigned to the information 117a. The information 117a includes topics and a body constituting the details. Here, when the operating dial 35 is made to rotate by a prescribed amount (for example, thirty degrees) in a clockwise direction or an counterclockwise direction, as shown in FIG. 11B, just the headings are displayed. Here, when the operating dial 35 is rotated by a prescribed amount (for example, thirty degrees) in a clockwise direction, as shown in FIG. 11C, the display range 13a moves the headings down by one line, so that heading 2, heading 3 and heading 4 are included in the display range 13a. Further, when the operating dial 35 is rotated by a prescribed amount (for example, thirty degrees) in an counterclockwise direction, as shown in FIG. 11D, the display range 13a moves to one line above with respect to a line of a heading, so that heading 0, heading 1 and heading 2 are included in the display range 13a. In this way, because movement (scrolling) of the display range 13a is one heading line at a time, this is faster than the scrolling of the second scrolling control unit 111b that is described later.

The display unit 13 displays information 117a recorded in the memory 117. It is preferable to display the information when halfway has elapsed for movement of the display range 13a at the display unit 13 when the display range 13a is moved by a scrolling operation. For example, information 117a is displayed when the display range moves by 0.3 lines, 0.5 lines and 0.7 lines. The memory 117 records the information 117a.

Figure 12:
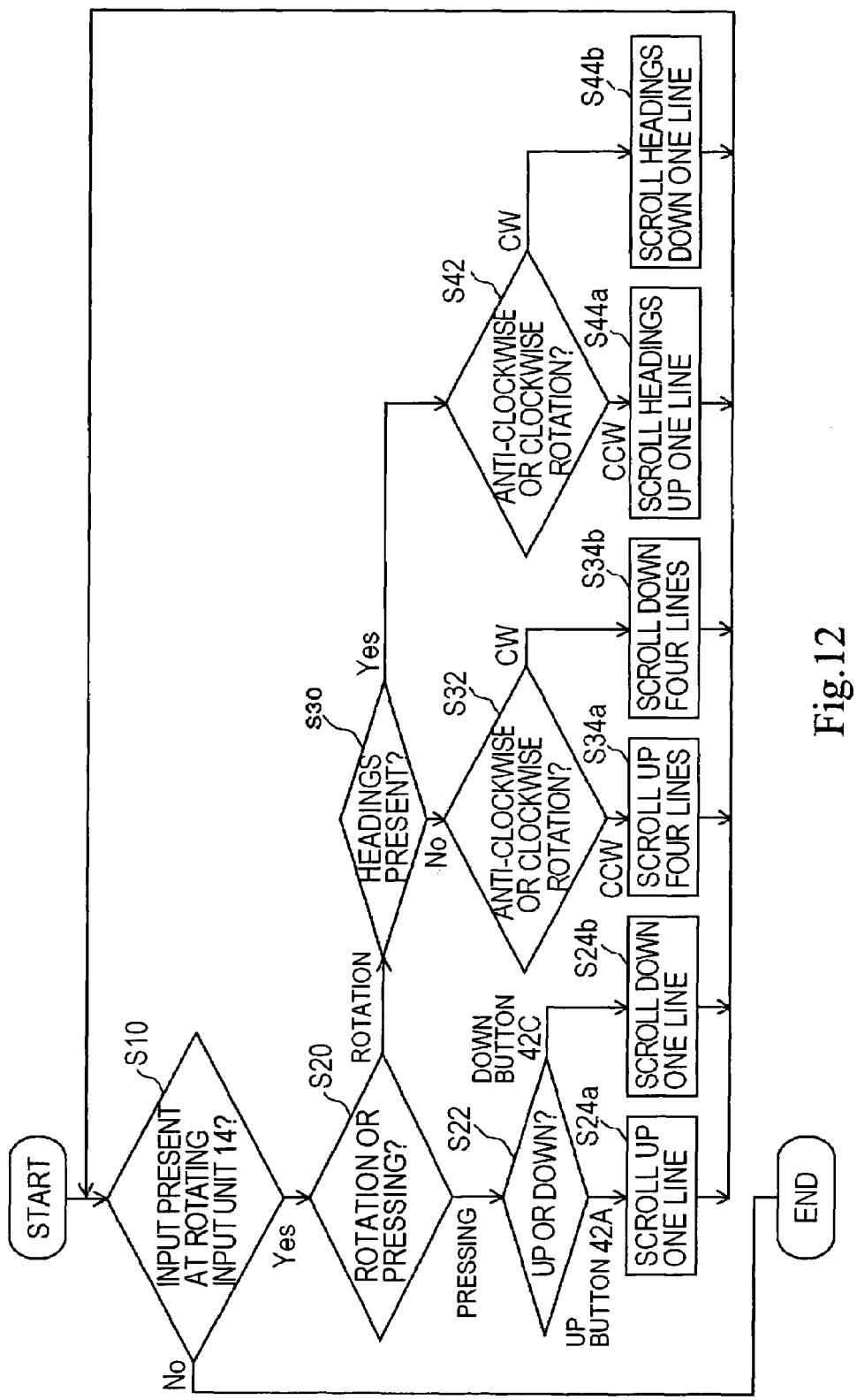
FIG. 12 is a flowchart showing the operation of the first embodiment of this invention.

Next, a description is given of the operation of the first embodiment of the invention with reference to the flowchart of FIG. 12.

First, the input detection unit 115 determines whether or not there is an input at the rotating input unit 14 (S10). If an input is present at the rotating input unit 14 (S10, Yes), a determination is made by the rotation detection unit 121 and push-down detection unit 122 as to whether the input is a rotation or pressing down of the operating dial 35 (S20).

If input to the rotating input unit 14 is a pressing down of the operating dial 35 (S20, pressing down), then the second scrolling control unit 14b operates. Here, if the upper button 42A is pressed (S22, up), the second scrolling control unit 14b causes the second scrolling control unit 111b to operate. The second scrolling control unit 111b then causes the display range 13a to move up one line (S24a). Further, if the lower button 42C is pressed (S22, down), the second scrolling operation unit 14b causes the second scrolling control unit 111b to operate. The second scrolling control unit 111b then causes the display range 13a to move down one line (S24b). Then, after the display range 13a is made to move up (down) one line (S24a, b), a determination as to the presence or absence of input to the rotating input unit 14 (S10) is returned to.

If input to the rotating input unit 14 is a rotation of the operating dial 35 (S20, rotation), then the first scrolling control unit 14a operates. The first scrolling operation unit 14a then causes the first scrolling control unit 111a to operate. The first scrolling control unit 111a then determines whether or not headings are assigned to the information 117a recorded in the memory 117 (S30).

If headings are not assigned to the information 117a (S30, NO), then the first scrolling control unit 111a carries out the scrolling described with reference to FIG. 10A to FIG. 10C. In other words, when the operating dial 35 is rotated by a prescribed amount (for example, thirty degrees) in an counterclockwise direction (S32, CCW), the first scrolling control unit 111a causes the display range 13a to move up four lines (S34a). When the operating dial 35 is rotated by a prescribed amount (for example, thirty degrees) in a clockwise direction (S32, CW), the first scrolling control unit 111a causes the display range 13a to move down four lines (S34b). Then, after the display range 13a is made to move up (down) four lines (S34a, b), a determination as to the presence or absence of input to the rotating input unit 14 (S10) is returned to.

If headings are assigned to the information 117a (S30, Yes), then the first scrolling control unit 111a carries out the scrolling described with reference to FIG. 11A to FIG. 11D. In other words, when the operating dial 35 is rotated by a prescribed amount (for example, thirty degrees) in an counterclockwise direction (S42, CCW), the first scrolling control unit 111a causes the display range 13a to move up by one line of headings (S44a). When the operating dial 35 is rotated by a prescribed amount (for example, thirty degrees) in a clockwise direction (S42, CW), the first scrolling control unit 111a causes the display range 13a to move down by one line with respect to the lines of headings (S44b). Then, after the display range 13a is made to move up (down) by one line with respect to the lines of headings (S44a, b), a determination as to the presence or absence of input to the rotating input unit 14 (S10) is returned to.

When there is no input to the rotating input unit 14 (S10, No), the scrolling processing ends.

According to the first embodiment, high-speed scrolling is performed by the first scrolling control unit 111a and low-speed scrolling is performed by the second scrolling control unit 111b. It is possible to switch over scrolling speeds, because the first scrolling control unit 111a is caused to operate by the first scrolling operation unit 14a and the second scrolling control unit 111b is caused to operate by the second scrolling control unit 14b. As a result, it is possible to include information that a user wants to view in the display range 13a of the display unit 13 in an appropriate manner with a fewer number of operations by appropriately switching over the scrolling speed. For example, high speed scrolling is carried out when the information it is wished to view is a long way from the display range 13a, and low speed scrolling is carried out when the information is close.

Further, operation of either the first scrolling operation unit 14a or the second scrolling control unit 14b can be decided upon by operating the operating dial 35 that is a common member. Specifically, if the operating dial 35 is rotated, the first scrolling operation unit 14a operates, and if it is pressed, the second scrolling control unit 14b operates. As a result, when changing over the scrolling speed, it is not necessary to operate a further member differing from the member that has been operated up until this time, and therefore scrolling speed can be changed over easily.

It is also possible to change over methods of high-speed scrolling using the presence or absence of headings for the information 117a, which is convenient during high-speed scrolling of the information 117a with headings.

Second Embodiment

The high-speed scrolling method of the first scrolling control unit 111a in the second embodiment is different from that of the first embodiment.

The mobile phone device (mobile information communication terminal) 1 of the second embodiment of the present invention is equipped with the first scrolling operation unit 14a, a second scrolling operation unit 14b, a first scrolling control unit 111a, a second scrolling control unit 111b, a display unit 13, a and memory 117. The configuration is similar to FIG. 7. In the following, portions that are similar to the first embodiment are given the same numerals and a description thereof is omitted.

The first scrolling operation unit 14a, the second scrolling control unit 14b, the second scrolling control unit 111b, the display unit 13 and the memory 117 are similar to the first embodiment.

The first scrolling control unit 111a changes the display range of information displayed by the display unit 13. The scrolling operation of the first scroll control unit 111a is now described with reference to FIG. 13A to FIG. 13C.

Figures 13A, 13B, 13C:
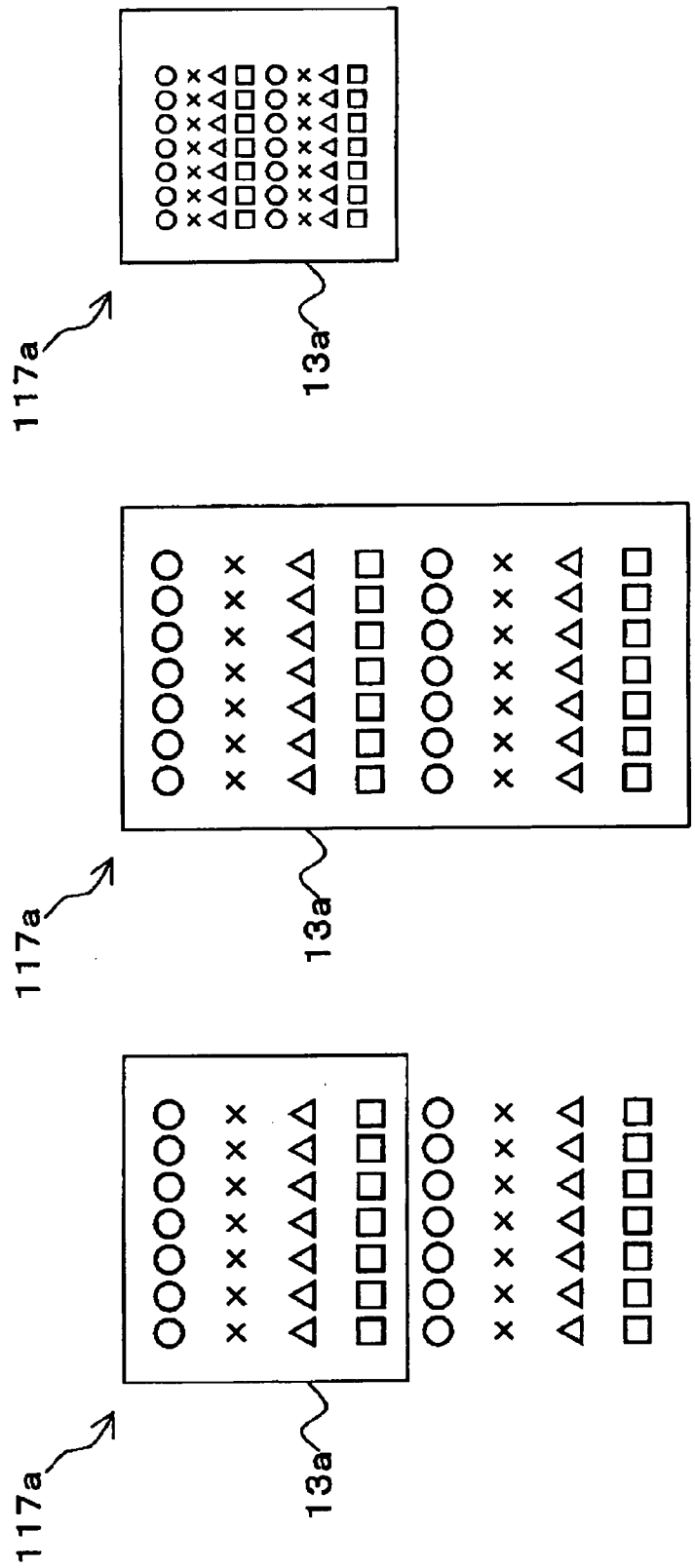
FIG. 13A to FIG. 13C are views showing ways of changing the display range using a first scrolling control unit 111a of a second embodiment, and they show an original display range 13a (FIG. 13A), a virtual display range 13a for when a large amount of information is to be included in the display range 13a (FIG. 13B), and an actual display range 13a for when a large amount of information is to be included in the display range 13a (FIG. 13C).

As shown in FIG. 13A, part of the information 117a is displayed at the display range 13a. Here, when the operating dial 35 is made to rotate by a prescribed amount (for example, thirty degrees) in a clockwise direction or an counterclockwise direction, as shown in FIG. 13B, the amount of information in the display range 13a is increased. For example, displaying four lines of information in the display range 13a is made to be displaying eight lines of information. The size of the characters, etc. expressing information is reduced in order to increase the amount of information in the display range 13a. In other words, in reality, the zooming-out shown in FIG. 13C is adopted.

Here, when the operating dial 35 is rotated by a prescribed amount (for example, thirty degrees) in a clockwise direction, the display range 13a is moved down by, for example, five to fifteen lines, and when the operating dial 35 is rotated by a prescribed amount (for example, thirty degrees) in an counterclockwise direction, the display range 13a is moved up by, for example, five to fifteen lines, i.e., scrolling is made quicker by the zoom-out portion.

After the first scrolling control unit 111a operates due to instructions by the first scrolling operation unit 14a, when there are no longer any instructions from the first scrolling operation unit 14a (when rotation of the operating dial 35 is halted), zooming-in takes place, and the display conditions for the situation before carrying out high-speed scrolling are returned to. For example, if high-speed scrolling is started from the state shown in FIG. 13A, then the state shown in FIG. 13C is attained (zoom out). Here, when rotation of the operating dial 35 is halted, the situation shown in FIG. 13A is returned to (zooming in).

Figure 14:
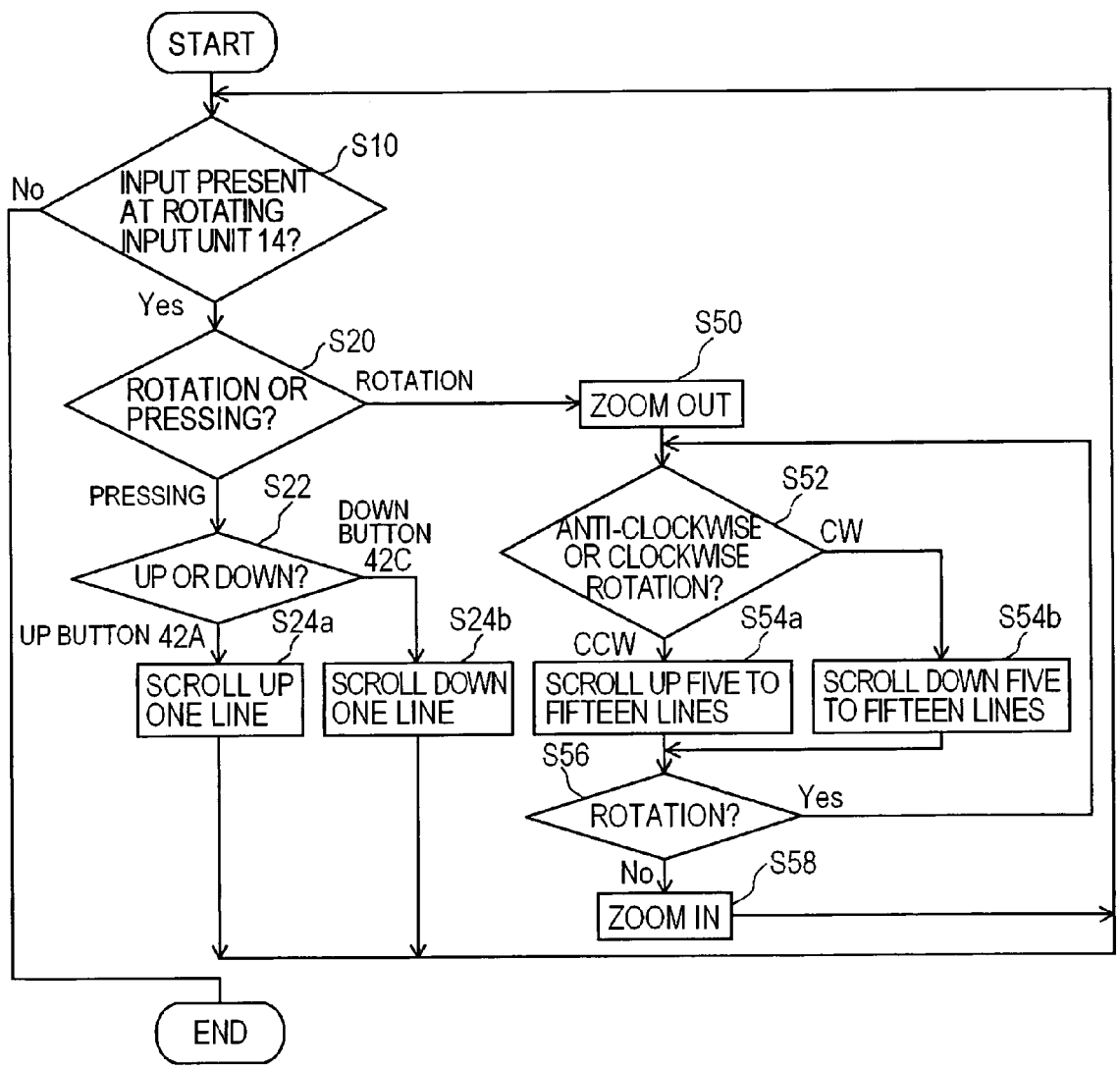
FIG. 14 is a flowchart showing the operation of the second embodiment of this invention.

Next, a description is given of the operation of the second embodiment of the invention with reference to the flowchart of FIG. 14.

First, the input detection unit 115 determines whether or not there is an input at the rotating input unit 14 (S10). If an input is present at the rotating input unit 14 (S10, Yes), a determination is made by the rotation detection unit 121 and push-down detection unit 122 as to whether the input is a rotation or a pressing down of the operating dial 35 (S20).

If input to the rotating input unit 14 is a pressing down of the operating dial 35 (S20, pressing down), then the second scrolling control unit 14b operates. Here, if the upper button 42A is pressed (S22, up), the second scrolling control unit 14b causes the second scrolling control unit 111b to operate. The second scrolling control unit 111b then causes the display range 13a to move up one line (S24a). Further, if the lower button 42C is pressed (S22, down), the second scrolling operation unit 14b causes the second scrolling control unit 111b to operate. The second scrolling control unit 111b then causes the display range 13a to move down one line (S24b). Then, after the display range 13a is made to move up (down) one line (S24a, b), a determination as to the presence or absence of input to the rotating input unit 14 (S10) is returned to.

If input to the rotating input unit 14 is a rotation of the operating dial 35 (S20, rotation), then the first scrolling control unit 14a operates. The first scrolling operation unit 14a then causes the first scrolling control unit 111a to operate. The first scrolling control unit 111a reduces the size of the characters, etc. expressing information in order to increase the amount of information 117a in the display range 13a (S50).

When the operating dial 35 is rotated by a prescribed amount (for example, thirty degrees) in an counterclockwise direction (S52, CCW), the first scrolling control unit 111a causes the display range 13a to move in the order of five to fifteen lines up (S54a). When the operating dial 35 is rotated by a prescribed amount (for example, thirty degrees) in a clockwise direction (S52, CW), the first scrolling control unit 111a causes the display range 13a to move in the order of five to fifteen lines down (S54b).

After the display range 13a is moved in the order of five to fifteen lines up (down) (S34a, b), the rotation detection unit 121 determines the presence or absence of a rotational input to the rotating input unit 14 (S56). If a rotational input is present (S56, Yes), a determination (S52) of the direction of rotation (clockwise or counterclockwise) of the operating dial 35 is returned to. If there is no rotational input (S56, No), zooming-in takes place, and the state before high-speed scrolling was carried out is returned to (S58). A determination (S10) of the presence or absence of an input to the rotating input unit 14 is then returned to.

When there is no input to the rotating input unit 14 (S10, No), the scrolling processing ends.

According to the second embodiment, the same effects as for the first embodiment can be demonstrated. The headings for the information 117a are not utilized, but high-speed scrolling is carried out using zooming-out. After high-speed scrolling has ended, zooming-in takes place, and display conditions are returned to the original conditions. Therefore, information can be made easy to see after completion of high-speed scrolling.

Further, the aforementioned embodiments can be implemented as follows. Media recorded with programs for implementing each of the above portions (for example, the first scrolling control unit 111a, the second scrolling control unit 111b) are read by a media reading device of a computer equipped with a CPU, a hard disc, a flash memory, and a media (floppy disc, CD-ROM, memory stick, etc.) reading device, and these programs are installed in a hard disc, a flash memory, etc. It also is possible to implement the above functions in this kind of method.

INDUSTRIAL APPLICABILITY

According to the present invention, it is possible to perform scrolling of information displayed by the display means selectively at different speeds in a straightforward manner using common scrolling operation means.

The invention claimed is:

1. A portable information terminal comprising:
    a display for displaying information;
    a scrolling device including a disc-shaped member capable of performing a rotating operation centered about an axis and capable of being pressed in the direction perpendicular to a planar surface of said disc-shaped member;
    said scrolling device enabling an operator to carry out a first operation and a second operation differing from said first operation;
    a first scrolling control device for performing said first operation and said second operation;
    wherein said first operation causes said display to scroll through information displayed at a first speed and said second operation causes said display to scroll through information displayed at a second speed slower than said first speed; and
    wherein the scrolling device comprises:
        a base;
        a holder mounted onto the base and including a dial support cylinder projecting perpendicularly from the center of the holder;
        a circular scale, including a central hole and slits positioned radially around the central hole, mounted onto the holder and having the dial support cylinder passing through the central hole thereof;
        a dial body, including a central hole, having a diameter greater that the circular scale, mounted onto the holder over the circular scale and having the dial support cylinder passing through the central hole thereof;
        the disc-shaped member including a central hole, mounted onto the holder over the dial body and having the dial support cylinder passing through the central hole thereof; and
        a cylindrical button having a diameter less than that of the dial support cylinder and positioned within the dial support cylinder.

2. The portable information terminal as described in claim 1, wherein said disc-shaped member of the scrolling device is mounted to the portable information terminal, such that the plane of said disc-shaped member is parallel to a surface of said scrolling portable information terminal to which said scrolling device is mounted.

3. The portable information terminal as described in claim 1, wherein said rotating operation is performed rotating said disc-shaped member of the scrolling device.

4. The portable information terminal as described in claim 3, wherein said second operation is performed by pressing at least one of a plurality of designated locations on a planar surface of said disc-shaped member.

5. The portable information terminal as described in claim 3, wherein information displayed by said display is compressed, the amount of information displayed by said display is increased, and information displayed by said display is scrolled, when said first operation is performed.

6. The portable information terminal as described in claim 5, wherein information displayed by said display is uncompressed, the amount of information displayed by said display is decreased, and information displayed on said display stops scrolling, when said first operation is no longer performed.

7. The portable information terminal as described in claim 1, wherein the base includes a central button surrounded by a plurality of buttons arranged in equal radial intervals about the central button.

8. The portable information terminal as described in claim 7, wherein the holder includes:

A plurality of press-down projections of the surface facing the base, corresponding to the plurality of buttons on the base arranged in equal redial intervals about the central button.

9. The portable information terminal as described in claim 7, wherein the first operation is performed by pressing on the disc-shaped member so as to depress one of the plurality of buttons arranged in equal radial intervals about the central button.

10. The portable information terminal as described in claim 1, wherein the base includes a plurality of restriction units for restricting the upward and rotational movement of the holder.

11. The portable information terminal as described in claim 10, wherein each restriction unit includes:

an upward movement restricting part, that keeps the holder mounted to the base;

a plurality of rotational restricting parts for preventing the holder from rotating.

12. The portable information terminal as described in claim 1, wherein the dial body is coupled to the disc-shaped member by a projection fitting protruding from the dialer member which is fit into a recess on the rear surface of the dial body facing the holder.

13. The portable information terminal as described in claim 1, wherein the circular scale is fit within a circular scale shaped cavity within the dial body.

14. The portable information terminal as described in claim 1, wherein the circular scale and the dial body are mounted to the holder by a plurality of support members protruding from the holder, which restrict detachment of the dial body.

15. The portable information terminal as described in claim 1, wherein the holder includes a plurality of brushes arranged on the surface of the holder, protruding in the direction of the circular scale, which are electrically conductive.

16. The portable information terminal as described in claim 15, wherein when the disc-shaped member is rotated, the dial body and circular scale rotate proportionally.

17. The portable information terminal as described in claim 16, wherein the direction of rotation is detected based on the state of the electrical contact of the brushes with the circular scale.

18. The portable information terminal as described in claim 16, wherein the direction of rotation is detected by the pattern of repeated contact between the slits and non-slit parts of the circular scale.

19. The portable information terminal as described in claim 16, wherein the rate of rotation is detected based on the rate of the electrical contact and non-contact between of the brushes with the circular scale.

20. The portable information terminal as described in claim 16, wherein dial body includes an uneven pattern on the portion in contact with the holder; and the holder includes a projection in contact with the uneven wave-shaped pattern, such that when the dial body is rotated by a user via the disc-shaped member a click-sensation is produced.

* * * * *

UNITED STATES PATENT AND TRADEMARK OFFICE
CERTIFICATE OF CORRECTION

PATENT NO. : 7,405,728 B2
APPLICATION NO. : 10/487351
DATED : July 29, 2008
INVENTOR(S) : Emi Arakawa et al.

It is certified that error appears in the above-identified patent and that said Letters Patent is hereby corrected as shown below:

Title Pg.,
Item (54) and Column 1, Line 1-4, should read:
-- PORTABLE INFORMATION TERMINAL, PROGRAM, AND RECORDING MEDIUM FOR RECORDING SAID PROGRAM --.

Column 12, Line 41:
"that" should read -- than --.

Column 13, Line 16:
"redial" should read -- radial --.

Signed and Sealed this

Eighteenth Day of November, 2008

JON W. DUDAS
*Director of the United States Patent and Trademark Office*